United States Patent Office 2,919,259
Patented Dec. 29, 1959

2,919,259

LIGHT STABILIZED POLYVINYL CHLORIDE COMPOSITIONS

Ralph A. Naylor, Stamford, Conn., and William B. Hardy, Bound Brook, N.J.

No Drawing. Application August 22, 1956
Serial No. 605,466

5 Claims. (Cl. 260—45.95)

This invention relates to light stabilized polyvinyl chloride compositions. More particularly, it relates to polyvinyl chloride compositions stabilized to light by the addition of both an antioxidant and an ultraviolet absorber.

Polyvinyl chloride and its heat stabilized compositions are not stable to light. On exposure to light they deteriorate, become discolored and lose tensile strength. Furthermore, samples exposed to light have a tendency to break when subjected to sudden stress and often break even when handled. Vinyl chloride polymers vary in properties depending upon the conditions of polymerization. We have observed various heat stabilized polyvinyl chloride compositions from different sources to be stable to light up to 88, 110, 198 and 242 hours when exposed in a Fade-Ometer, a standard machine in the field for measuring exposure to light.

Efforts in the prior art to improve stability to light have not been entirely satisfactory. Improvements obtained in the past with known light stabilizers have been very limited falling short of the desired degree of stability and homogeneity which is obtained by the present invention.

The present invention is directed to an improved heat stabilized polymerized vinyl chloride having properties which make it commercially attractive.

Other efforts of the prior art have been the inclusion of an acid neutralizing compound, the function of which is to combine with hydrochloric acid formed when the polyvinyl chloride is exposed to light. The light stabilizers of the present invention have the effect of reducing the rate at which the hydrochloric acid is evolved from the polyvinyl chloride polymeric composition rather than to absorb it in the acid neutralizing additive. Thus, our invention is an improvement over such efforts of the prior art.

We have found that by using both an antioxidant and an ultraviolet absorber, in combination, with a polyvinyl chloride homopolymer composition, we get a greatly improved stability to light in excess of 300 to 500 hours and higher. This improvement is greater than the effect of the antioxidant used alone or the ultraviolet absorber used alone. The use of ultraviolet absorber alone has been known in the prior art but its improvement is limited compared to the excellent stability against deterioration by light shown by our new combination. The use of antioxidants in compositions containing unsaturated bonds such as rubber to prevent oxidation thereof is known. The use of these antioxidants in a polyvinyl chloride polymer, containing no unsaturation, in combination with an ultraviolet absorber is novel and provides unusually good results.

We have found that the use of amounts of from about 0.01 to 5% by weight of a suitable antioxidant and from about 0.01 to 5% by weight of an ultraviolet absorber, based on the weight of the polyvinyl chloride provide a marked increase in the light stability of polyvinyl chloride compositions. Preferably, amounts of from about 0.05% to 2% of each of the antioxidant and ultraviolet absorber are employed with selective choice of ultraviolet absorbers and antioxidants, and compositions which are almost six times as stable to light (as unlight-stabilized polyvinyl chloride compositions) are obtained.

The novel light stabilizers of this invention, which comprises combinations of antioxidants and ultraviolet absorbers, are entirely compatible when used on unstabilized or heat stabilized polyvinyl chloride compositions. Heat stabilized compositions of polyvinyl chloride comprise polyvinyl chloride, a plasticizer and at least one heat stabilizer which is mixed and fused, for example, on a roll mill or internal mixers such as a Banbury mixer. Organosols or plastisols may also be incorporated where fusion is to be done in an oven or under heat lamps and the like. The present ultraviolet absorber-antioxidant stabilizing combination may be added to the mixture after it has been compounded or at the various stages of compounding. The antioxidant and ultraviolet absorber may be added singly or together at any stage of compounding of the heat stabilized composition or they may be dispersed in a solvent or plasticizer, prior to the addition thereof to the polyvinyl chloride. Moreover, the stabilizer components are compatible with other additives used in the art such as fillers, waxes, pigments and the like to make commercially useful polyvinyl chloride compositions. It is thus seen that the manner of addition of the stabilizing components is not critical to our invention.

For purposes of illustration of the invention, Geon 101, a polyvinyl chloride plasticized with dioctyl phthalate (i.e. "DOP" or more accurately di-2-ethylhexyl phthalate), and at least one and usually two heat stabilizers which stabilize the polyvinyl chloride composition during heat processing or molding is employed. The preparation of polyvinyl chloride compositions to which the light stabilizing combination of the invention is added may be prepared in a known manner such as those described in Calvin E. Schildknecht, "Vinyl and Related Polymers," John Wiley & Sons, New York, 1952, pages 421–425, or H. Smith, "British Plastics," vol. 27, pages 176–179, 213–217, 307–311 (1954).

The light stabilizing combinations of the present invention comprise at least one ultraviolet absorber and at least one antioxidant added to a heat stabilized polyvinyl chloride composition.

Various types of ultraviolet absorbing compounds are suitable for the combinations such as o-hydroxybenzophenones which may be further substituted with various groups like alkyl, alkoxy, hydroxy, and halogen. Examples of such o-hydroxybenzophenones are: 2-hydroxy-4-methoxy-4'-chlorobenzophenone, 2-hydroxy-5-methylbenzophenone, 2,2'-dihydroxybenzophenone, 2-hydroxy-4'-methoxybenzophenone, 2 - hydroxy - 4-butoxybenzophenone, 2,2' - dihydroxy - 4-methoxybenzophenone, 2-hydroxy-4-methoxybenzophenone, 2-hydroxy-4-ethoxybenzophenone, 2 - hydroxy - 4 - methoxy-4'-bromobenzophenone, 2 - hydroxy-4,4'-dimethoxybenzophenone, 2-hydroxy-4,4'-dimethoxy-3-methylbenzophenone, 2-hydroxy-4-ethoxy-4'-methylbenzophenone, 2-hydroxy-4-ethoxy-4'-ethylbenzophenone, 2 - hydroxy - 4,4'-diethoxybenzophenone, 2-hydroxy-4-ethoxy-4'-propoxybenzophenone, 2-hydroxy - 4-ethoxy-4'-bromobenzophenone, 2,2'-dihydroxy-4,4' - dimethoxybenzophenone, 2,2'-dihydroxy-4,4'-diethoxybenzophenone, 2,2' - dihydroxy-4-methoxy-4'-ethoxybenzophenone, 2,2'-dihydroxy-4-methoxy-4'-butoxybenzophenone, 2,2' - dihydroxy-4-ethoxy-4'-propoxybenzophenone, 2,2'-dihydroxy-4-ethoxy-4'-butoxybenzophenone, 2-hydroxy - 4,4',5' - trimethoxybenzophenone, 2-hydroxy-4,2',4'-tributoxybenzophenone. The following o-hydroxybenzophenones are especially suitable for the combinations: 2-hydroxy-4,4'-dimethoxybenzophenone, 2-hydroxy - 4-methoxybenzophenone, 2,2'-dihydroxy-4,4'-dimethoxybenzophenone, 2 - hydroxy-4'methoxybenzophenone, 2,2'-dihydroxy-4-methoxy-4'-ethoxybenzophenone, 2,2'-dihydroxy-4-methoxybenzophenone.

Other ultraviolet absorbers which may be employed are 1-(2-hydroxy)naphthophenone; dibenzofuran and the esters of benzene carboxylic acids such as: o-cresylbenzoate, o-tolylbenzoate; methyl salicylate; 2-butoxyethyl salicylate; o-tolyl salicylate; 2-xenyl salicylate; 2-cyclohexylphenyl salicylate.

The antioxidant employed in combination with the ultraviolet absorber may be chosen from antioxidants such as: phenolics, e.g. p-methoxy phenol; p-tertiaryamylphenol; 2-butyl-4-methoxy-phenol; 4,4'-dihydroxydiphenyl-dimethylmethane glycidyl polyether; 2,2'-methylene-bis-[4-methyl-6-tertiarybutylphenol]; 2,2'-methylene-bis-[4-methyl-6-tertiaryamylphenol] 2,2'-methylene-bis-[4-ethyl-6-tertiarybutylphenol]; 2,2'-methylene-bis-[4-ethyl-6-tertiaryamylphenol]; 3,4-methylenedioxyphenol; 2,6-ditertiarybutyl-4-methylphenol; 2,6-ditertiarybutyl-4-ethylphenol; catechol; hydroquinone; 1-naphthol; pyrogallol; ascorbic acid; and the like. Other suitable antioxidants which may be employed and their method of preparation are such as described in U.S. Patent 2,538,355.

Preferred antioxidants are those of hindered phenols, i.e. those which have a branched chain such as a tertiary butyl or tertiary amyl group in ortho position to the hydroxy group. Such hindered phenolic antioxidants have less tendency to discolor polyvinyl plastic compositions in functioning as antioxidants than do unhindered phenols.

Examples of particularly preferred light stabilizing combinations are ultraviolet absorbers 2-hydroxy-4-methoxybenzophenone, 2,2'-dihydroxy-4-methoxybenzophenone or 2,2'-dihydroxy-4,4'-dimethoxybenzophenone combined with hindered phenolic antioxidants such as 2,2'-methylene-bis - [4 - ethyl-6-tertiarybutylphenol] or 2,2'-methylene-bis-[4-ethyl-6-tertiarybutylphenol].

These new light stabilizing combinations are especially useful for articles which require exceptional light stability such as raincoats, upholstery, shades, draperies, shower curtains and transparent wrappers to protect colored materials and consumer goods from deterioration. The light stabilized compositions of the instant invention may be used also as coatings for store windows and skylights; coatings for paper, glass fiber laminates and plastics; for aircraft construction where stability to light is very important; and in containers in which it is desired to protect or preserve the chemical or pharmacological or pesticidal activity of active materials. The composition of the present invention also finds special application in polyvinyl floor and tile compositions which are extremely durable to wear and are gaining in use.

The following examples illustrate the invention but are not intended to limit it. Parts are by weight unless otherwise noted. The Fade-Ometer hours show the time that the sample of polyvinyl chloride can be irradiated without change. Samples were exposed to ultra-violet rays in a standard Fade-Ometer at a temperature of 60° C.–65° C. In all determinations, observations were made on test samples before, during, and after exposure, until a visual color change or darkening demonstrated the beginning of deterioration resulting from the exposure. The accuracy of the Fade-Ometer results in about ± 50 Fade-Ometer hours.

In order that the invention may be fully understood, the following examples are set forth for purposes of illustration. Specific enumeration of details should not be interpreted as limitations except as expressed in the appended claims.

*Example 1*

A plastic composition is prepared by making a mixture of 100 parts polyvinyl chloride, 50 parts of di-2-ethylhexylphthalate, 3 parts of cadmium ricinoleate and 1 part of cadmium 2-ethylhexoate. The mixture is placed on a two-roll mill having rollers heated to about 266° F. and fluxed for 10 minutes. The additives of the following examples are included in the above mixture before milling. The batch is remilled and a sheet of 25 mil thickness drawn off. The sheet is cooled in a room of controlled humidity (50% relative humidity) and controlled temperature (78° F.). The sheets are then cut into experimental strips, mounted and tested in a Fade-Ometer. The number of hours necessary for the first spot or sign of decomposition to occur is then noted.

*Example 2*

Using the method of formulation of Example 1, the following light stabilization is obtained with the stabilizer additives shown.

| Additive | First Evidence of Deterioration at Fade-Ometer Hours |
| --- | --- |
| 1. No additive, i.e. the plastic composition of Example 1 | 242 |
| 2. 2,2'-methylene-bis-[4-methyl-6-tertiarybutylphenol] antioxidant, 0.1 part per 100 parts polyvinyl chloride | 264 |
| 3. 2-hydroxy-4-methoxybenzophenone U.V. absorber 0.1 part per 100 parts polyvinyl chloride | 374 |
| 4. 0.1 part of each of (2) and (3) per 100 parts polyvinyl chloride | 572 |

*Example 3*

A mixture of 100 parts of polyvinyl chloride and 50 parts of di-2-ethylhexylphthalate is placed on a two-roll mill having rollers heated to about 266° F. and fluxed for 10 minutes. The additives of the following examples are included in the above mixture before milling. The batch is remilled and a sheet of 25 mil thickness drawn off. The sheet is cooled in a room of controlled humidity (50% relative humidity) and controlled temperature (78° F.). The sheets are then cut into experimental strips, mounted and tested in a Fade-Ometer. The number of hours necessary for the first spot or sign of decomposition to occur is then noted.

With additives amounting to 0.2 part per 100 parts polyvinyl chloride, the following light stabilization is obtained.

| Additive | First Evidence of Deterioration at Fade-Ometer Hours |
| --- | --- |
| 1. No additive, i.e. the plastic composition as prepared above | 88 |
| 2. Antioxidant of Example 2 | 198 |
| 3. 2,2'-methylene-bis-[4-ethyl-6-tertiarybutylphenol] antioxidant | 264 |
| 4. 2,2'-dihydroxy-4,4'-dimethoxybenzophenone, U.V. absorber | 352 |
| 5. Combination of (4) and (2), 0.2 part of each being used | 506 |
| 6. Combination of (4) and (3), 0.2 part of each being used | 484 |

*Example 4*

A mixture of polyvinyl chloride (Geon 101), 100 parts, and of 50 parts of di-2-ethylhexylphthalate is premixed in a chain mill. The mixture is then put on a two roll heated mill as in Example 1 and heat stabilizers added. These consist of 2 parts of Mark XI heat stabilizer (i.e. mixed barium and cadmium ricinoleates) and 1 part of Mark XX, a triaryl phosphite chelating agent. Then 0.1 part of the additives for light stabilization are added. The composition is then given 40 passes through the rolls, cut and molded to a sheet 2 by 5 by 0.05 inches and exposed in the Fade-Ometer.

| Additive | First Evidence of Deterioration at Fade-Ometer Hours |
|---|---|
| 1. No additive, i.e. the elastomer composition prepared above without additives | 200 |
| 2. 2-hydroxy-4'-methoxybenzophenone, U.V. absorber | 220 |
| 3. Antioxidant 2,2'-methylene-bis-[4-ethyl-6-tertiary butyl phenol] | 250 |
| 4. Combination of (2) and (3) | 340 |

The polyvinyl chloride polymers of the present invention contemplate homopolymers and copolymers of vinyl chloride having a major proportion, i.e. from 75 to 100% preferably 85 to 100% by weight vinyl chloride and up to 25% of a polymerizable vinyl comonomer. Examples of suitable comonomers are such as vinyl acetate, vinylidene chloride, acrylonitrile, methyl acrylate, methyl, ethyl and butyl, methacrylate, dibutyl maleate and the like.

Examples of suitable plasticizers which may be employed are various esters such as alkyl phthalates, di (2-ethylhexyl) phthalate, dicapryl phthalate, didecyl phthalate, orthyl decyl phthalate; alkyl or aryl phosphates such as tricresyl phosphate, trioctyl phosphate, octyl diphenyl phosphate; long chain aliphatic dibasic acid esters such as dioctyl adipate, dioctyl sebacate; polyalcohol dibasic aliphatic acid polyesters such as propyleneglycol sebacate polyester, propyleneglycol adipate polyester; and the like.

Examples of suitable stabilizers which may be employed are such as the basic lead salts, e.g. carbonate, stearate, phosphite, phthalate, sulfate lead salts; barium, cadmium and strontium soaps, e.g. ricinoleate, laurate, 2-ethyl hexanoate (mixtures of these soaps frequently give better results); tin compounds e.g. dibutyl tin dilaurate; epoxy compounds, e.g. butyl, isobutyl, heptyl, octyl, epoxy stearates; sodium organo phosphates, e.g. sodium penta-octyl and penta-capryl tripolyphosphate, triaryl phosphites, triphenyl phosphite.

We claim:

1. A composition of matter comprising a polyvinyl chloride and as a light-stabilizer therefor, from about 0.01% to 5% based on the weight of said polyvinyl chloride of each of an orthohydroxy benzophenone selected from the group consisting of 2-hydroxy-4-methoxy benzophenone, 2,2'-dihydroxy-4,4' - dimethoxy benzophenone and 2,2'-dihydroxy-4-methoxy benzophenone, and a phenolic antioxidant which is a symmetrical 2,2' methylene bis phenol substituted in the number 4 positions with an alkyl group of from 1 to 2 carbon atoms and in the number 6 positions with a tertiary alkyl group of from 4 to 5 carbon atoms.

2. A plasticized, heat-stabilized polyvinyl chloride composition containing from 0.01% to 5% based on the weight of said polyvinyl chloride of each of the ultraviolet absorber 2-hydroxy-4-methoxy benzophenone and a phenolic antioxidant which is a symmetrical 2,2' methylene bis phenol substituted in the number 4 positions with an alkyl group of from 1 to 2 carbon atoms and in the number 6 positions with a tertiary alkyl group of from 4 to 5 carbon atoms.

3. A plasticized, heat stabilzed, polyvinyl chloride composition containing from 0.01%–5% based on the weight of said polyvinyl chloride of each of the ultraviolet absorber 2-hydroxy-4-methoxybenzophenone and the antioxidant 2,2'-methylene-bis-[4-methyl - 6 - tertiary butyl phenol].

4. A plasticized, heat stabilized, polyvinyl chloride composition containing from 0.01%–5% based on the weight of said polyvinyl chloride of each of the ultraviolet absorber 2,2'-dihydroxy-4,4'-dimethoxybenzophenone and the phenolic antioxidant of claim 1.

5. A plasticized, heat stabilized, polyvinyl chloride composition containing from 0.01%–5% based on the weight of said polyvinyl chloride of each of the ultraviolet absorber 2,2'-dihydroxy-4-methoxybenzophenone and the phenolic antioxidant of claim 1.

References Cited in the file of this patent

UNITED STATES PATENTS

| 2,126,179 | Duggan | Aug. 9, 1938 |
| 2,429,155 | Boyer | Oct. 14, 1947 |
| 2,605,244 | Matlack | July 29, 1952 |
| 2,659,709 | Daglish | Nov. 17, 1953 |
| 2,824,070 | Fischer | Feb. 18, 1958 |

UNITED STATES PATENT OFFICE

CERTIFICATE OF CORRECTION

Patent No. 2,919,259  December 29, 1959

Ralph A. Naylor et al.

It is hereby certified that error appears in the above numbered patent requiring correction and that the said Letters Patent should read as corrected below.

In the grant, lines 1 and 2, for "Ralph A. Naylor, of Stamford, Connecticut, and William B. Hardy, of Bound Brook, New Jersey," read -- Ralph A. Naylor, of Stamford, Connecticut, and William B. Hardy, of Bound Brook, New Jersey, assignors to American Cyanamid Company, of New York, N. Y., a corporation of Maine, --; line 11, for "Ralph A. Naylor and William B. Hardy, their heirs" read -- American Cyanamid Company, its successors--; in the heading to the printed specification, lines 4 and 5, for "Ralph A. Naylor, Stamford, Conn., and William B. Hardy, Bound Brook, N. J." read -- Ralph A. Naylor, Stamford, Conn., and William B. Hardy, Bound Brook, N. J., assignors to American Cyanamid Company, New York, N. Y., a corporation of Maine --; column 3, line 42, for "4-ethyl-" read -- 4-methyl- --.

Signed and sealed this 12th day of July 1960.

(SEAL)
Attest:
KARL H. AXLINE
Attesting Officer

ROBERT C. WATSON
Commissioner of Patents